United States Patent [11] 3,556,366

[72] Inventor George A. Kim
Chicago, Ill.
[21] Appl. No. 821,026
[22] Filed May 1, 1969
[45] Patented Jan. 19, 1971
[73] Assignee Teletype Corporation
Skokie, Ill.
a corporation of Delaware

[54] METHODS OF SEVERING MATERIALS EMPLOYING A THERMAL SHOCK
10 Claims, 2 Drawing Figs.

[52] U.S. Cl. ........ 225/1, 225/93.5
[51] Int. Cl. ........ B26f 3/06
[50] Field of Search ........ 225/1, 93.5; 29/583

[56] References Cited
UNITED STATES PATENTS

| | | | |
|---|---|---|---|
| 1,777,644 | 10/1930 | Hitner | 225/93.5 |
| 2,146,373 | 2/1939 | Keier | 225/93.5 |
| 2,169,687 | 8/1939 | Fowler et al. | 225/93.5 |

*Primary Examiner*—Frank T. Yost
*Attorneys*—J. L. Landis and R. P. Miller

ABSTRACT: One or more conductive paths are formed on a substrate capable of thermal fracture, and then thermal energy is applied along the paths to fracture the substrate along lines defined by the paths. This technique may be used to separate a plurality of electrical circuits formed on a glass or ceramic substrate, by forming a gridwork of intersecting paths defining the desired boundaries of the circuits. Preferably, the conductive paths are heated using electrical energy to induce the thermal shock, although the paths may also be heated and then the substrate quenched to induce the shock.

PATENTED JAN 19 1971 3,556,366

INVENTOR
GEORGE A. KIM

BY J. L. Landis
ATTORNEY

METHODS OF SEVERING MATERIALS EMPLOYING A THERMAL SHOCK

BACKGROUND OF THE INVENTION

In the manufacture of film or printed electrical circuits, a plurality of identical circuits are usually fabricated at one time on a single parent substrate, frequently composed of materials such as glass or ceramics which are subject to thermal fracture. In the electronics industry, such circuits are commonly separated from each other by external cutting means such as diamond saws, diamond scribes, or more recently by laser beams. Scoring of ceramic substrates, such as alumina, to create stress lines prior to the formation of the circuits, has also been utilized extensively. In this process, after the circuits are formed, the substrate can be broken fairly readily along the score lines by applying a bending force. All of the above cutting or scoring methods are relatively costly, due in part to the cost of the equipment involved and in part to problems in tooling, setup time, and contamination due to dust formed in the cutting processes.

Severing of certain materials, such as glass, by thermal shock has been known for many years, one example being disclosed in E. W. Keier U.S. Pat. No. 2,146,373. This method includes the use of a pattern which may be heated or cooled. The material to be severed is heated or cooled and is then placed in contact with the pattern, which is then heated or cooled so as to create a thermal shock gradient. The material is then severed through thermal-shock-induced fracture along lines defined by the pattern. The difficulties encountered in such a severing process are due mainly to problems in assuring accurate registration and the inability to achieve intimate contact between the material to be severed and the pattern without applying unduly high clamping force. When the intimacy of contact is insufficient, there will occur a nonuniformity in the cleavage pattern.

SUMMARY OF THE INVENTION

One principal object of the present invention is to provide an improved method for rapidly and economically severing materials by thermal fracture.

A further object is to provide a method for severing substrates by thermally inducing shock fractures adjacent to a thermal gradient path pattern which is integrally formed on or in the substrate, thus eliminating problems in adapting the prior-known thermal-shock processes.

Another object is to provide a photographic method for forming on a single substrate a multiple number of electrical circuits and electrically conductive paths, together with a method of severing the substrate beneath the multiple conductive paths by impressing energy along the paths to subject the underlying substrate to thermal shock.

With these and other objects in view, the present invention contemplates a method of severing materials subject to thermal shock, wherein conductive paths are incorporated on or in the material and subjected to thermal energy sufficient to induce thermal fracture along lines defined by the paths. The shock may be induced solely by electrical heating, or by heating combined with quenching of the substrate.

As applied to separating electrical circuits, typically deposited on glass or ceramic substrates, a gridwork of conductive paths is deposited on the substrate when the circuit is being formed, so that the paths surround the individual circuits and define their boundaries. The conductive paths extend across the substrate to the outer edges thereof and preferably are terminated in common conductors which are also formed on the substrate. Electrical power is then applied alternately and cyclically to the common conductors to heat the conductive paths to the power level necessary to induce the thermal shock and sever the substrate along the lines defined by the intersecting paths.

DESCRIPTION OF THE DRAWINGS

Other objects, advantages and features of the invention will become apparent from the following detailed description of specific examples and embodiments thereof, in conjunction with the accompanying drawings, wherein.

DETAILED DESCRIPTION

A — Introduction

Figure 2:
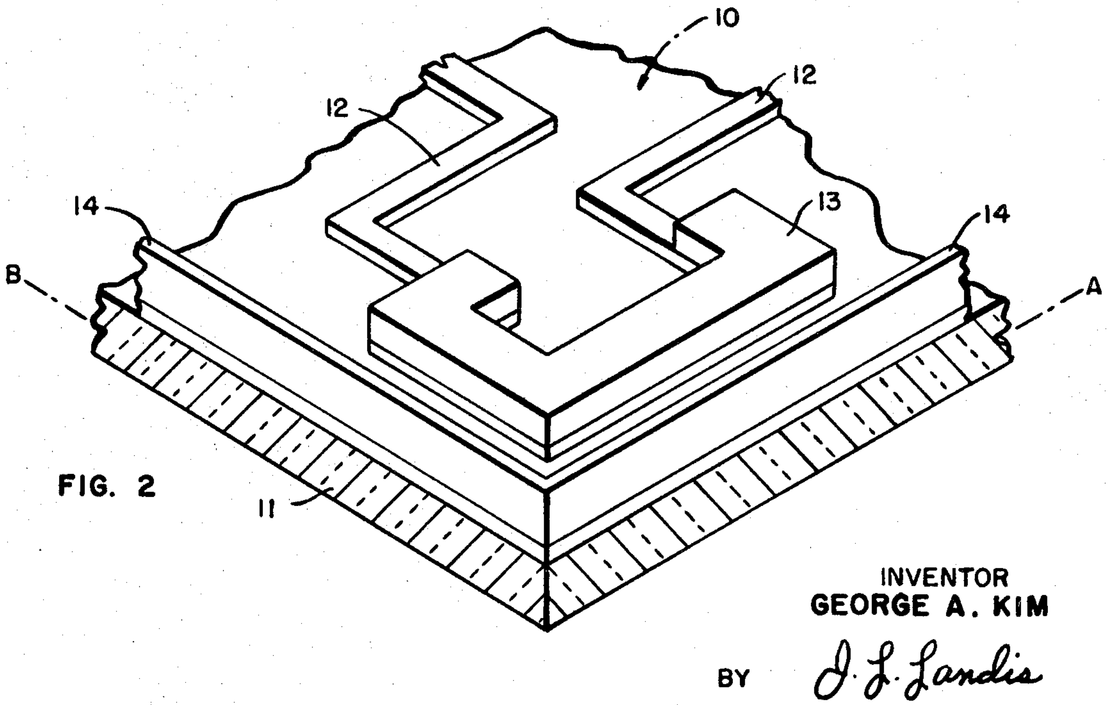
FIG. 2 is a perspective view of a corner portion of one of the circuits, after separation.

Referring to the drawings, there is shown in outline a plurality of individual electrical circuits 10 formed on a thin rectangular substrate 11 of insulating material. For simplicity, six circuits are shown, designated CKT 1 to CKT 6, whereas in practice it is more common to fabricate a larger number (such as eighteen to thirty) circuits at a time on a single substrate. The specific nature of the circuits is not material to the invention, and they may be of any kind such as "printed" circuits or "thick film" or "thin film" circuits deposited on or applied to the substrate in various ways to define conductors, resistors, capacitors, etc. The particular example illustrated in FIG. 2 is a tantalum thin-film circuit, including a pattern of tantalum nitride resistors 12 sputtered on the substrate and conductive areas or terminal "pads" 13 deposited on the tantalum nitride. The conductive and resistive areas are selectively etched in accordance with generally conventional photoetching techniques to define the desired resistor and conductor patterns, as well as capacitor electrodes, etc. Specific details of the manufacture of such circuits are disclosed in Bell Laboratories Record articles (1) R. W. Berry "Tantalum Thin-Film Circuitry and Components," Vol. 41, pp. 46—50 (Feb. 1963); and (2) D. A. McLean et al. "Tantalum Integrated Circuits" Vol. 44, pp. 304—311 (Oct.-Nov. 1966). Also of interest is D. Gerstenberg U.S. Pat. No. 3,242,006, which relates particularly to the formation of tantalum nitride resistors.

The substrate 11 may be glass, ceramic or any other material capable of being fractured by thermal shock in accordance with this invention. One typical substrate material widely used in the manufacture of film circuits is high-purity aluminum oxide, typically in thicknesses of 0.02 to 0.03 inch. The shape and thickness of the substrate is not particularly critical to the practice of the invention, so long as it is not so thick that it cannot be thermally fractured in accordance with the invention.

The conductive pads may be various conductive metals usually combinations of metal layers, which are compatible with each other and the resistive film. Normally, the conductive metal is deposited as an area film covering an area film of tantalum nitride, and the two films are then selectively etched with individual solvents to define first the conductive and later the resistive areas. As illustrated in FIG. 2, the conductive metal layer remains on a tantalum nitride under layer in the pad areas 13, but acts essentially as a conductor since the parallel tantalum-nitride resistive path may be ignored for practical purposes. Two commonly used conductive metal combinations which are particularly suited for the practice of this invention are (1) a titanium-gold sandwich, with the gold on the surface, and (2) a nickel/chromium alloy-copper-palladium sandwich, with the palladium on the surface and the nickel-chromium alloy bonded to the tantalum nitride. Examples of the nickel/chromium-copper-palladium contact and methods of making are given in R. F. Brewer et al. U.S. Pat. No. 3,413,711.

B — General Principles of the Invention

Figure 1:
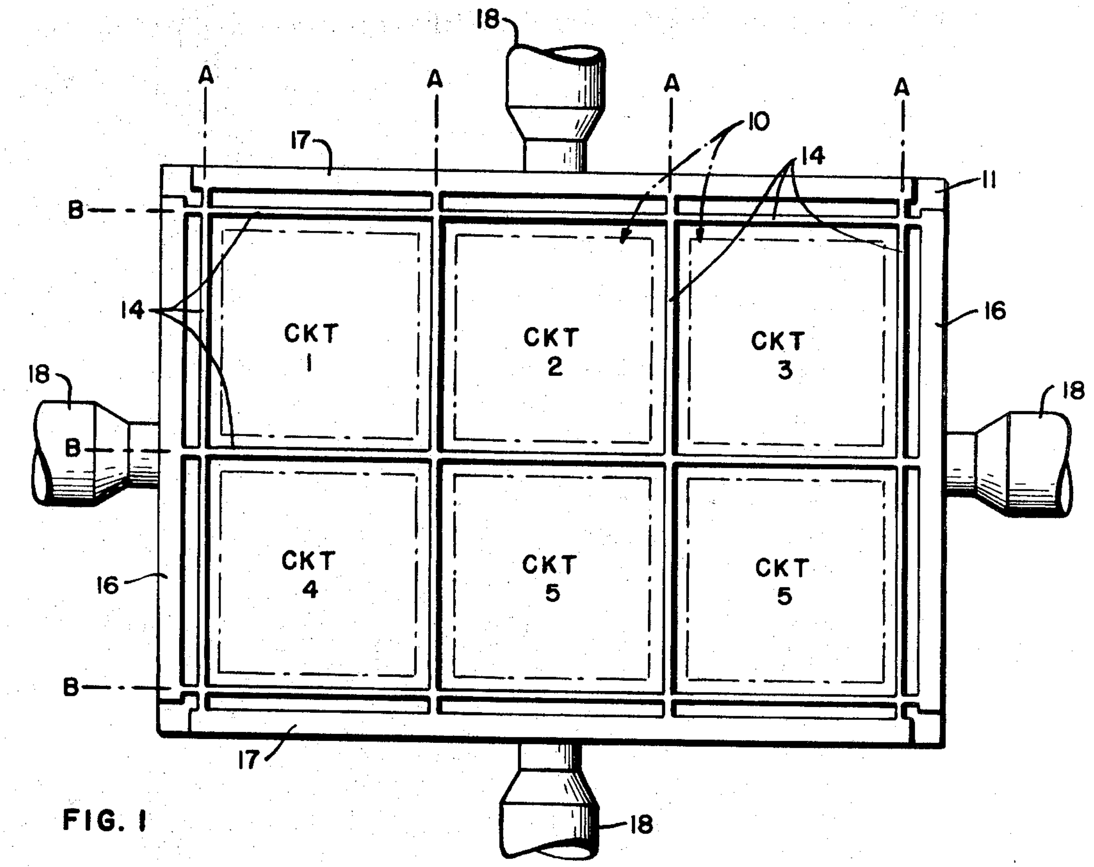
FIG. 1 is a plan view of a substrate upon which individual electrical circuits, intersecting conductive paths and common conductors have been formed in accordance with one embodiment of the invention, prior to fracturing the substrate to separate the individual circuits.

In accordance with this invention, a plurality of conductive "fracture" paths 14 are deposited on or applied to the substrate 11 in a pattern corresponding to lines A–A and B–B along which it is desired to sever the substrate 11. In the example of FIG. 1, seven such paths 14 are deposited, four (A–A) vertical as viewed in FIG. 1 and three (B–B) horizontal for fracturing the substrate 11 to form the six individual circuits indicated. One of the paths 14 runs along and defines each edge-to-be-formed of each circuit 10. In general, the paths may be conductive or resistive material of various kinds applied in any standard way to the substrate, so long as they can be utilized to develop sufficient thermal potential to fracture the substrate in accordance with the invention.

Preferably, the paths are formed of conductive rather than resistive material, and desirably are of the same material that is used to fabricate the conductive pads 13 (FIG. 2). In this way, the fracture paths 14 can be formed at the same time as the pads 13 and using the same artwork; thus no additional processing steps are needed.

In the specific example of tantalum thin-film circuits, where the pads 13 are formed by selective etching of an area film of conductive metals, the fracture paths 14 are also formed by etching at the same time. The only change required from the standard photoetching techniques is to include a representation of the paths 14 in the artwork used to define the conductive areas. For example the artwork commonly includes a master transparency through which light is passed to expose and set the selected patterns in a photosensitive coating, such that all nonexposed areas may be etched away to define the desired conductive patterns. This technique of using the same artwork has the important advantage of always guaranteeing that the individual circuits 10 are precisely aligned with respect to the fracture lines, since the same artwork is used to form both the circuit 10 and fracture paths 14. Thus, essentially 100 percent alignment can be achieved employing the skill and precision of the mask-making art, rather than the much less precise skills available in mechanically indexing the circuit after formation as in the prior scribe-and-break processes, or before formation in the prescored substrate processes.

In the example of FIG. 1, where generally rectangular circuits 10 are to be formed and then separated, the conductive paths 14 are formed in an orderly X–Y coordinate grid configuration centered on the desired fracture lines A–A and B–B. In order to sever the substrate along the fracture paths 14, thermal energy is imparted along the paths to an energy level sufficient to fracture the substrate along the paths. In practice the shock is normally produced by electrical heating, either alone or coupled with subsequent chilling to fracture.

Although individual terminals could be used to connect the ends of the fracture paths 14 to an electrical power source, it is more efficient to use common terminals at each end of all paths running in the same direction. In the embodiment illustrated, the three fracture paths 14 which extend in the X-coordinate direction in FIG. 1 (along lines B–B) are terminated by and connected to one pair of common conductors 16–16 and the four extending in the Y-coordinate direction (lines A–A) are terminated by another pair of common conductors 17–17, which are perpendicular to the first pair. The conductors 16 and 17 are formed along portions of the outer margins of the substrate 11, as shown, and are spaced from each other and from the fracture paths 14. Preferably, the conductors 16 and 17 are also composed of the same metals used for the conductive pads 13, and are also formed during the photoetching process using the same masks. In the specific example, they are merely wider areas of the same contact metals, being sufficiently wider that the practical effect of the heating is concentrated in the relatively thin lines defining the fracture paths 14.

After the fracture paths 14 and common conductors 16 and 17 have been deposited and the circuits have been processed to the point where separation is desired, a set of four electrical bus bars or probes 18 which can be connected to a conventional electrical power supply (not shown) are connected to the common conductor pairs 16 and 17 as indicated in FIG. 1. The common conductor pairs are then alternately pulsed to apply sufficient electrical power to heat the conductive paths 14 at such a rate as to induce the requisite thermal shock to sever the substrate along the conductive path patterns A–A and B–B. Preferably, the X and Y paths are alternately pulsed at fairly rapid intervals, such as 60 cycles per second, at the same power levels to fracture in both directions substantially simultaneously. The conductive paths 14 must be wide enough and thick enough to receive the necessary power, in order to induce the requisite thermal shock for cleavage, without burning up. The dimensional requirements for the paths may be computed or experimentally determined to correlate with the power available, typical examples of line widths and power levels being given hereafter under "Example."

In another embodiment of the invention, the electrical power supply probes 18 are first attached to the common conductor pairs 16 and 17, which are then alternately pulsed as described in the previous paragraph to heat the conductive paths 14 to a predetermined temperature which per se is somewhat below that required for thermal shock. Upon reaching this predetermined temperature, the substrate 11 is then quenched by a suitable heat transfer media, which causes the temperature of the substrate, around and/or under the conductive paths 14 to drop at such a rate as to induce the thermal shock. The quenching may be accomplished either through immersion of the substrate 14 in a suitable coolant, such as cool oil, by spraying a refrigerent such as alcohol or dichlorodifluormethane on the substrate 11, or by bringing the substrate into intimate contact with a cooled plate. In some circumstances, it may be desirable to preheat or precool the entire substrate to a given uniform temperature before starting the electrical pulsing.

C — Example

A specific example illustrating the practice of the invention relates to the manufacture of tantalum thin-film circuits of the type previously described and illustrated in FIGS. 1 and 2, including a substrate 11 in the form of a 0.026 inch-thick rectangular plate composed of 98 percent aluminum oxide. In FIG. 2, the vertical dimensions are greatly exaggerated for clarity. A 1,200 A. layer of tantalum nitride is sputtered on the entire upper surface of the substrate 11 to form a resistive area film which later will be etched such that remaining parts of the film form the resistors 12. Successive metallic laminae are then evaporated or otherwise deposited over the entire tantalum nitride layer to form a conductive area film bonded firmly to the resistive film. The metallic laminae in the example consists of 200—500 A. of an 80 percent nickel-chronium alloy vacuum evaporated on the tantalum nitride, a 10,000 A. copper layer evaporated on the nickel-chromium and a 4,000 A. palladium layer evaporated atop the copper layer. Another widely used and equally suitable conductive film is titanium-gold. The conductive sandwich may be regarded for functional purpose as a single layer, unetched parts of which form the conductive pads 13, the fracture paths 14, and the common conductors 16 and 17.

The composite conductive film is then etched by standard photoetching techniques to form the conductive areas 13, 14, 16 and 17, after which the tantalum nitride film is selectively etched to form the resistors 12 and other components (not shown). The grid work fracture pattern A–A and B–B consists of fine lines 14 of the conductive film on tantalum nitride, in the example 0.025 inch wide by about 3¼ nches long. The distance between the fracture paths 14 and the nearest elements of the circuits 10 is about 0.015 inch. This clearance insures electrical separation of the fracture paths 14 from the circuit, so that the circuits cannot be damaged when power is applied, and so that the fracture paths if left in place will not interfere with the circuit in use. The common conductors 17 and 18 consist of areas of the conductive film on tantalum nitride about 0.050 inch wide. Each fracture path 14 is a continuous film connected with a common conductor area 16 or 17 at each end.

The substrate is now prepared for fracture as previously described. The power requirements to fracture vary considerably with the type and thickness of the substrate, and the nature and dimensions of the conductive fracture paths 14. In practice, this is most easily established by merely increasing the power applied to a sample of the particular circuit until the substrate cracks, thus establishing the fracture power level empirically.

A conventional 117-volt AC, 15-amp 60-cycle power supply was used in the example, with a potentiometer to increase the power within the available range, and a conventional diode coupling circuit to transmit power alternately to the X and Y probes 18 such that each group of fracture paths X and Y is alternately pulsed at a switching rate of 60 cycles per second. Variable resistors are used between the power supply and the probes to equalize as nearly as possible the power applied to the X and Y paths to assure as near simultaneous fracture as possible.

In the specific example, the composite conductive lines 14 of nickel/chromium-copper-palladium 0.025 inch wide have a sheet resistance of about 0.01 ohms/sq., thus a resistance of about 1.5 to 2 ohms for lines 3.5 to 4 inches long is typical. The electrical power supplies (I2R) determines the heat generated. In practice, the alumina substrates snap after about 100 cycles, at about 7 to 8 amps and 117 volts giving a power requirement to fracture of the order of 600 watts per square inch for this type of substrate.

Since the conductive films 14, 16 and 17 are spaced from the circuits 10, they may be left on the completed circuits as nonfunctioning borders, or they may be removed in whole or in part where desired by etching, abrasion, etc.

D — Alternatives

In an alternative embodiment, the fracture lines 14–14 are formed of tantalum nitride (approximately 0.030 inch wide), from which the conductive film is removed in the conductor-etching step. The common conductors 16—17 are of the conductive material as in the previous example. Resistive films are operable in the process as well as conductive films, but conductive films are generally preferred because their lower resistances allow higher heating currents to be generated.

The tantalum-nitride fracture paths are similarly pulsed to locally heat the substrate and cause fracture. When this is done a surface layer of the tantalum-nitrite is converted to tantalum pentoxide, which is an electrically insulating material and thus effectively isolates the gridwork of fracture paths 14 from the circuits 10.

In practice, various combinations of conductive or resistive materials may be used including either thick or thin films, the main criterion being that the material be capable of receiving sufficient power to crack the substrate without damaging the circuits or the substrate. It is most convenient to utilize one or more of the same materials used in fabricating the circuit, preferably for the conductive areas, because this be done without adding process steps and assures accurate registration. It is also possible to fracture susceptible materials for other purposes than separating electrical circuits, one could merely be forming accurate outlines in a substrate or sheet for any purpose.

I claim:

1. A method of severing a substrate that is subject to thermal fracture, which comprises:
   - depositing a conductive path on a surface of the substrate to form an integral coating on the substrate extending along a desired fracture line; and
   - imparting thermal energy along the path of such magnitude as to impart thermal shock to the substrate sufficient to fracture the substrate along the line defined by the path.

2. The method as recited in claim 1, wherein the step of imparting thermal energy is performed by electrically heating the conductive path to a sufficient power level to impart the requisite thermal shock.

3. The method as defined in claim 2, wherein the conductive path is formed of a material that is oxidized during the heating step to form an insulating oxide on the surface thereof.

4. The method as recited in claim 1, wherein the step of imparting thermal energy is performed by electrically heating the conductive path to a level below that required to fracture, and then quenching the substrate to produce the thermal shock.

5. A method of separating into several portions a substrate that is subject to thermal fracture, which comprises:
   - depositing a pattern of intersecting conductive paths on a surface of the substrate to form integral coatings on the substrate extending across the substrate to the outer edges thereof, defining the desired lines of separation; and
   - applying electrical energy to the opposite ends of each path to heat the paths and sections of the substrate contiguous thereto with sufficient power to thermally fracture the substrate along the lines defined by the conductive paths.

6. The method as recited in claim 5, for separating the substrate into rectangular portions, wherein:
   - the paths are deposited in a gridlike pattern of intersecting paths extending across the substrate to the outer edges thereof;
   - opposed ends of the conductive paths in a first direction are terminated with a first pair of common conductors;
   - opposed ends of the conductive paths in a second direction are terminated with a second pair of common conductors; and
   - the common conductor pairs are electrically pulsed alternately, to heat the conductive paths connected thereto evenly and to fracture the substrate along the gridlike pattern.

7. A method of separating a plurality of isolated electrical circuits formed on a single glass or ceramic substrate capable of thermal fracture, to form individual circuit units, which comprises:
   - depositing a plurality of intersecting conductive fracture paths on a surface of the substrate to form integral coatings on the substrate between the circuits, defining the lines along which the substrate is to be severed to provide the individual circuit units; and
   - electrically pulsing the paths to heat them to a power level sufficient to thermally fracture the substrate along the lines defined by the paths.

8. A method as recited in claim 7, for use in separating circuits having conductive areas formed by masking techniques to provide conductive patterns on the substrate, wherein the step of forming the fracture paths is performed using additional patterns in the same mask and using the same conductive materials that are used to form the conductive patterns for the circuit.

9. In a method of forming a plurality of isolated thin-film circuits simultaneously on a ceramic substrate, of the type wherein area films of conductive and resistive metals are deposited in sequence on the substrate and are then selectively etched by photo-masking techniques to define conductive and resistive circuit patterns on the substrate, the method of severing the substrate to provide individual circuits, which comprises:
   - forming a gridwork of conductive paths between the circuits and out of contact therewith, each path extending to opposed outer edges of the substrate, such that each circuit to be formed is separated from the next by one of the paths, the paths being formed using at least one of the same metals used in the circuit and being formed at the same time and using the same artwork as is used for the circuit; and
   - electrically heating the gridwork of paths sufficiently to thermally fracture the substrate along lines beneath the paths to separate the circuits.

10. The method as recited in claim 9, wherein the substrate is aluminum oxide, the resistive film is tantalum nitride, and the conductive film includes a layer of gold or palladium, and wherein the fracture paths are formed from the conductive metal.